United States Patent [19]

Owen

[11] 4,129,010
[45] Dec. 12, 1978

[54] TUNNEL

[75] Inventor: John A. Owen, Beaconsfield, Canada

[73] Assignee: Montreal Engineering Company, Limited, Montreal, Canada

[21] Appl. No.: 831,394

[22] Filed: Sep. 8, 1977

[30] Foreign Application Priority Data

Aug. 25, 1977 [CA] Canada .................................. 285449

[51] Int. Cl.² ............................................. F16L 1/00
[52] U.S. Cl. .................................. 405/169; 405/132; 405/217
[58] Field of Search ............................ 61/105, 87–98, 61/1 R, 42, 107

[56] References Cited

U.S. PATENT DOCUMENTS

| 3,518,840 | 7/1970 | Mertz | 61/105 |
| 3,635,036 | 1/1972 | Hooper | 61/105 |
| 3,710,579 | 1/1973 | Killmer et al. | 61/34 |

FOREIGN PATENT DOCUMENTS 2416378  10/1975  Fed. Rep. of Germany ............. 61/105

Primary Examiner—Dennis L. Taylor
Attorney, Agent, or Firm—Wenderoth, Lind & Ponack

[57] ABSTRACT

A method of making a connection to protect a shore approach section of an underwater pipeline comprises drilling a hole downwardly through the sea bed, introducing a sealed pipe riser, which may, or may not, have an elbow welded to the upper end thereof, into the hole; grouting the inserted pipe riser in the hole and connecting a tunnel section to the shore with the pipe riser. A pipe is passed through the tunnel and joined to the pipe riser. The tunnel pipe may be connected to the pipe riser after the drilling of the hole by the completion of the tunnel to intersect the pipe riser or, in the alternative, the tunnel section may be completed first and have the leading end thereof sealed off by a bulkhead, whereafter the hole is drilled to intersect the tunnel at the sealed off tunnel end and the connection of tunnel pipe and pipe riser is accomplished by dewatering the leading end of the tunnel and opening the bulkhead. The method is particularly useful in ice covered water crossings and here the drilling of the hole is accomplished using the ice surface as a support platform for the drilling rig.

8 Claims, 3 Drawing Figures

TUNNEL

BACKGROUND OF THE INVENTION

The present invention relates to methods of making pipeline connections.

Difficulties have been experienced with protecting the shore approach section of submarine pipelines and it is an object of the present invention to provide a method which affords a high degree of protection in this area.

SUMMARY OF THE INVENTION

Accordingly, the present invention provides a method of making a pipeline connection comprising the steps of drilling a hole downwardly through the water bed; introducing a sealed pipe riser into said hole; grouting said inserted pipe riser in said hole; connecting a tunnel section from the shore with said pipe riser; and joining a pipe passed through said tunnel with said pipe riser.

Conveniently, an elbow section may be attached to the upper end of the pipe section so that the elbow section will protrude from the hole when the pipe section is grouted therein.

In a preferred configuration, the tunnel section is made substantially at right angles to the hole.

The tunnel section may be connected to the pipe riser after the drilling of the hole by the completion of the tunnel to intersect the pipe riser, or in the alternative, the tunnel section can be completed first, but with the leading end thereof sealed off by means of a bulkhead, thus when the hole is drilled to intersect the tunnel section, it intersects the leading end of the tunnel section which is sealed off from the tunnel section proper by means of the bulkhead. In this instance, the connection of the tunnel pipe with the pipe riser is accomplished by opening the bulkhead.

The present invention is suitable for operation in ice-covered sea conditions and under these circumstances, the drilling step may conveniently be conducted from an ice platform. In this instance, the method will include the step of drilling a hole through the ice platform.

Allowances for pipe expansion may be conveniently accommodated by providing an expansion section coupled to the pipe section on the sea bed.

BRIEF DESCRIPTION OF THE DRAWINGS

The following is a description by way of example of one embodiment in accordance with the present invention reference being had to the accompanying drawings in which.

DETAILED DESCRIPTION OF PREFERRED EMBODIMENT

Figure 1:
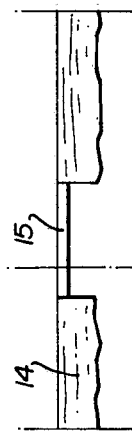
FIG. 1 diagrammatically shows the first stage in the exemplary method.
Figure 1:
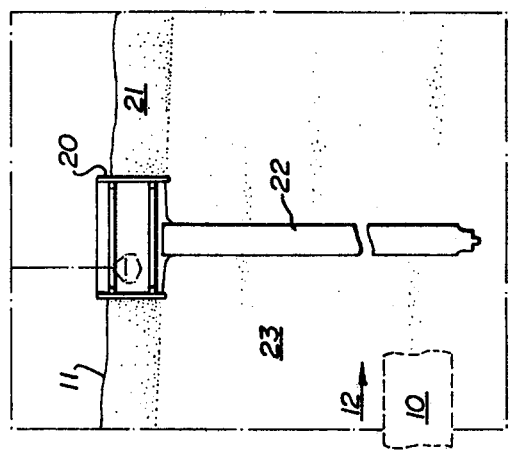

Referring now to the drawings, in FIG. 1, a tunnel 10 is created under the sea bed 11 in the direction of the arrow 12. Suitable stagings, craneage and drilling rigs (not shown) are positioned on the ice layer 14 and first a hole 15 is drilled in the ice. In the example illustrated, it is assumed that the overburden 21 is of depth and type that requires a cofferdam 20 to be lowered through the hole 15 formed in the ice onto the sea bed 11 and sunk under its own weight through the overburden 21 by grabbing. The overburden is removed from within the cofferdam 20 and a hole 22 is drilled by a drilling rig downwardly through the sea bed 11. The hole 22 is bored through bedrock 23 to the predetermined tunnel invert level. A pipe riser 25 is lowered into the hole 22 with grout pipes and spacer fins (not shown), for centering purposes, strapped to the pipe.

Figure 3:
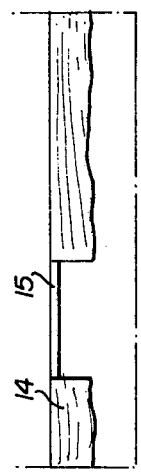
FIG. 3 shows a third stage.
Figure 3:
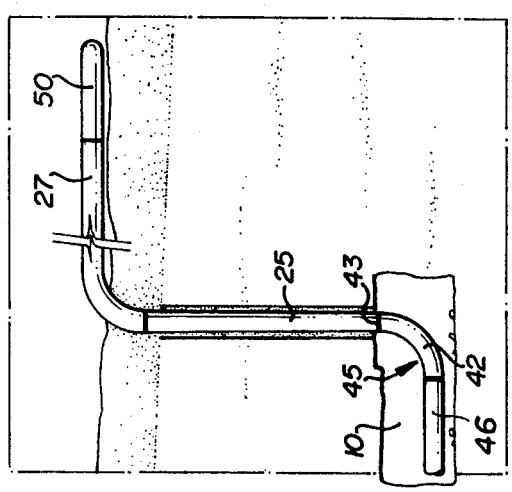
Figure 2:
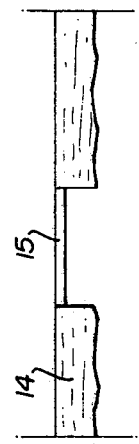
FIG. 2 diagrammatically shows a second stage therein.
Figure 2:
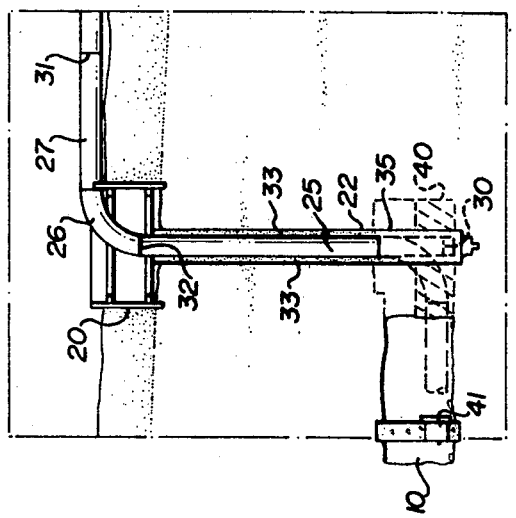

In the configuration shown in FIG. 2, the upper end of the pipe riser 25 is provided with an elbow or top bend 26 and a horizontal section 27. The pipe riser 25 is sealed at is lower end 30 and at its upper end 31. Of course, the pipe riser 25 could equally well be sealed at 32 if the elbow 26 and section 27 were not attached. The annulus 33 created around the pipe riser 25 in the hole 22 is filled with small size aggregate and grouted from approximately the tunnel crown level 35, upwards. In this fashion, the pipe riser 25 is grouted into the hole 22.

If the hole 22 has been bored in weak rock, it is possible to follow the drill down with a protective steel lining tube, with the pipe riser 25 therein, and grout the outside of this tube to complete the hole 22 and simultaneously grout the riser 25 in the tube. The access tunnel 10 is then driven towards the pipe riser 25 in the direction of the arrow 12 and stopped just short of the intersection point. Exploratory holes are drilled from the tunnel face. If water infiltration is encountered, then secondary grouting may be carried out together with the construction of a bulkhead 41. After the pipe riser 25 has been carefully exposed, the bottom end thereof with its sealed portion 30 is cut off and the tunnel pipe bend 42 positioned and welded in free air at 43 to the pipe riser 25 and then the pipe 46 is welded to the pipe bend 42.

If required, it is possible to pressurize a bottom chamber 45 as for sea bed "habitats" to complete access to the vertical pipe riser 25 and make the welded joints, the bulkheads, in this instance being replaced by an airlock. Whilst the tunnel 10 is being pushed forward, or before that if desired, the cofferdam 20 may be removed and the space which it leaves, backfilled.

An expansion joint 50, preferably an expansion loop, may be welded to the pipe section 27 by means of a "habitat" operation or otherwise.

It is to be understood that the order of operation could be somewhat different, if desired, in that the tunnel 10 and its bottom chamber 41 could be completed first and then sealed with the bulkhead 41, whereafter the hole 22 would be completed then the connection of the tunnel 10 to the pipe riser 25 could be completed by opening the bulkhead 41 after dewatering the bottom chamber 45.

What I claim as my invention is:

1. A method of making a pipeline connection beneath a body of water comprising the steps of positioning a drilling means at the water surface; drilling a hole downwardly through the water bed; introducing a pipe riser sealed at each end into said hole; grouting said inserted pipe riser in said hole to seal said hole from ingress of water; connecting a tunnel section from a shore with said riser; and joining a pipe passed through said tunnel with said pipe riser in such a manner as to permit fluid to flow from one to the other.

2. A method as claimed in claim 1 in which said pipe riser includes an elbow section at its upper end which elbow protrudes from said hole when said pipe riser is grouted in said hole.

3. A method as claimed in claim 1 in which said tunnel section is at substantially right angles to said hole.

4. A method as claimed in claim 1 wherein the step of connecting the tunnel section with the riser is accomplished by completing the tunnel to intersect said riser.

5. A method as claimed in claim 1 in which said drilling step is conducted from an ice platform.

6. A method as claimed in claim 5 including the step of drilling a hole in the ice platform.

7. A method as claimed in claim 1 wherein an expansion section is coupled to said pipe section above the hole on the water bed.

8. A method as claimed in claim 1 further comprising the steps of forming a bulkhead in said tunnel prior to the completion of the installation of said riser, said step of connecting said tunnel section with said riser being accomplished by opening said bulkhead.

* * * * *